May 8, 1956 R. T. MOORE ET AL 2,744,487
LIQUID SIGHT GLASS
Filed Aug. 21, 1953

INVENTORS
ROBERT T. MOORE
GEORGE G. HORNUNG
BY
Christy Parmelee and Strickland.
THEIR ATTORNEYS United States Patent Office 2,744,487
Patented May 8, 1956

2,744,487

LIQUID SIGHT GLASS

Robert T. Moore, Pittsburgh, and George G. Hornung, Latrobe, Pa.

Application August 21, 1953, Serial No. 375,665

1 Claim. (Cl. 116—117)

This invention relates to liquid indicators of the type generally referred to as flow indicators. More particularly the invention relates to an indicator or sight glass to show the presence and flow of liquid in a flow line such as is used in a mechanical refrigeration system.

The refrigerants used in mechanical refrigerators operate under high pressure and usually have a low vapor pressure to be efficient for refrigeration purposes. It is important to have an indication of liquid in the refrigeration circuit to show proper operation of the system. This requires the use of a sight glass in the flow line which must be sealed in the flow line to withstand high pressures, and the seal must be sufficiently tight to prevent either liquid or vapor leakage, and to be unaffected by substantial changes in temperature.

Devices of this kind presently available are of a relatively expensive, complicated construction utilizing a glass tube joined at each end to a pipe fitting through a joint sealed with a gasket, while a metal shell encases the tube and is joined to the fittings. This shell has opposed windows through which the tube may be observed. Failure of such devices in service occurs from leakage around or deterioration of the gaskets, and the devices are frequently broken by shock or by being twisted when the fittings are coupled into or loosened from a pipe line, the metal shell being insufficient to protect the tube from twisting strains.

The primary object of the present invention is to provide a liquid flow indicator of this type in which the use of a glass tube is rendered unnecessary, as is also a protective metal shell. A further object of the invention is to provide a liquid flow indicator of a rugged but relatively inexpensive construction in which there are no gaskets and in which glass windows are fused into a rigid metal body so constructed as to eliminate also the need for separate end fittings, and which resists any twisting torque or strain that is encountered in the normal use of these devices, thus avoiding the stressing of the glass.

With these and other objects in view, the invention consists in the liquid indicator herein illustrated and described and particularly defined in the appended claims.

The various features of the invention are illustrated in the accompanying drawings, in which.

The liquid indicator of the present invention is preferably made of an integral elongated body of metal having a central longitudinal bore therethrough, and integral pipe connections at each end by which it may be connected into a flow line. It is preferably formed of brass for use in a refrigerating system, but may be made of any acceptable metal, and a section from a solid rod or bar stock of non-circular shape is used.

Figure 1:
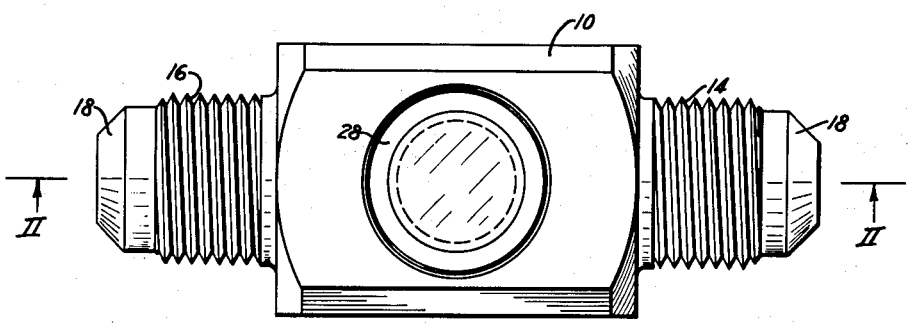
Fig. 1 is a view in side elevation of a fluid indicator embodying the preferred form of the invention.
Figure 2:
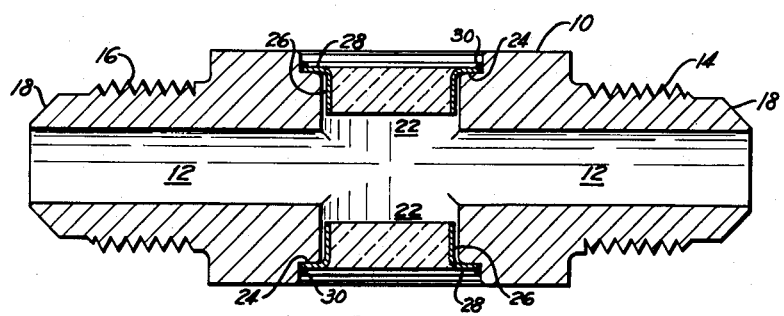
Fig. 2 is a vertical sectional view of the fluid indicator taken on line II—II of Fig. 1.
Figure 3:
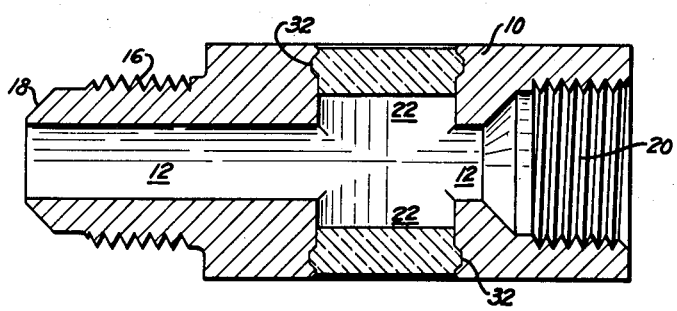
Fig. 3 is a vertical sectional view of a fluid indicator having windows fused to the indicator body and illustrating the construction of an indicator having a male nipple at one end and a threaded female opening at the other end.

This integral body 10 has a central longitudinal opening 12 therethrough and has threaded nipples 14 and 16 at its opposite ends. As shown in Figs. 1 and 2, each nipple has an inclined face 18 against which an outwardly-flared flange on a flow line tube may be pressed by a flare nut for the purpose of making a tight joint. In Fig. 3 there is a nipple 16 at one end and a threaded nipple receiving socket 20 is formed at the other end. The body is thus formed with integral pipe connections of the form generally used with refrigeration tubing.

Intermediate its ends a transverse opening 22 is formed in the body, the outer ends of the opening being counterbored to form recessed shoulders 24. The opening 22 thus provides opposed window openings into the longitudinal passage 12 through the body.

The window openings are closed by a glass disk or window set into the opening, there thus being two such disks opposed to each other, and they are hermetically sealed by fusion in place. For this purpose a connection eliminating thermal strains is employed. A borosilicate glass that is clear when molded for the purpose of observing the liquid flow may for example be used. This boron glass is united by fusion with an eyelet or thimble 26 having an outwardly-extending flange 28 arranged to fit within the counter-bore and seat on shoulder 24 in the body 10. The boron glass has a coefficient of expansion substantially equal to the coefficient of expansion of the thimble 26 so that when these two parts are united by fusion there will not be any rupture of the glass due to unequal expansion and contraction of the glass and metal thimble. The thimble is of a metal to which the glass will fuse, and preferably has a coefficient of expansion substantially matched to the glass. A metal for the purpose, widely sold under the trade-mark "Kovar" is well suited for this purpose, since the glass will not be strained when the thimble is brazed into the recess. To provide for the expansion and contraction of the thimble or eyelet in a brass body, the outer peripheral edge only of the thimble is united by a weld or solder 30 to provide a substantial length of metal formed with a bend for expansion between the bond of the thimble with the block 10, and the bond of the glass with the thimble. The bond between the thimble is obtained by soldering, brazing or welding, which is indicated hereinafter as a bond by fusion.

As shown in Fig. 3, the body 10 may be made entirely of a metal such as the alloy "Kovar" which has a coefficient of expansion substantially equal to the coefficient of expansion of the borosilicate glass. In this case the glass is cast directly into the indicator body, and fused directly thereto. We have shown the upper portion of the glass extends into a cavity 32 formed around the upper peripheral edge of the window openings in the block, but this is not required. By this construction the window is bonded by fusion directly to the body of the indicator block, and since the metal and glass have the same cofficient of expansion there is no difficulty of fracture or failing of the glass due to expansion and contraction.

As shown in the drawings, the outside of the body is polygonal, being substantially square with beveled corners, thereby having flat faces by which the block may be engaged with a wrench to hold or turn the block while the unit is being connected into or removed from the flow line. However, the body 10 may be hexagonal or octagonal if desired. With the construction shown in the drawings, the integral metal body is rigid and strong, and therefore the strains encountered in mounting the indicator in the flow lines does not put any strain on the glass windows in the indicator, and the glass windows are recessed from the planes of the surfaces of the body so that they are not contacted by a wrench, even if carelessly used.

The preferred form of the invention having been thus described, what is claimed as new is:

A liquid flow indicator comprising a rigid metal body having a threaded connection at each end to which a pipe may be joined and having wrench-engaging faces integrally formed thereon to enable the joined pipe ends to be made tight, said body having a longitudinal bore extending therethrough and having a transverse bore providing opposed openings into the longitudinal bore, each end of the transverse bore being countersunk to provide an annular shoulder inwardly from the outer end of the bore, a glass button of less diameter than the bore set into each end of the bore, a collar of metal having its coefficient of thermal expansion substantially matched to the glass surrounding the periphery of the glass button and hermetically fused thereto, the collar also being loosely received in the bore, each of said collars having an outwardly-turned flange overlapping the annular shoulder and hermetically joined around its periphery by metal fusion to the body, the outer surfaces of the glass buttons being inset from the surface of the metal body.

References Cited in the file of this patent

UNITED STATES PATENTS

| | | |
|---|---|---|
| 1,806,313 | Shand | May 19, 1931 |
| 2,267,556 | Eisele | Dec. 23, 1941 |
| 2,594,113 | Askin | Apr. 22, 1952 |
| 2,600,148 | Wittlin | June 10, 1952 |
| 2,620,663 | Fine | Dec. 9, 1952 |
| 2,650,562 | Bonar | Sept. 1, 1953 |
| 2,664,846 | Gray | Jan. 5, 1954 |
| 2,681,034 | Mannion | June 15, 1954 |